United States Patent [19]
Burke

[11] Patent Number: 6,026,377
[45] Date of Patent: *Feb. 15, 2000

[54] COMPUTER SYSTEM FOR ALLOWING A CONSUMER TO PURCHASE PACKAGED GOODS AT HOME

[76] Inventor: Raymond R. Burke, 1700 N. Russell Rd., Bloomington, Ind. 47408

[*] Notice: This patent is subject to a terminal disclaimer.

[21] Appl. No.: 09/205,882

[22] Filed: Dec. 4, 1998

Related U.S. Application Data

[63] Continuation of application No. 08/686,755, Jul. 25, 1996, Pat. No. 5,848,399, which is a continuation of application No. 08/159,335, Nov. 30, 1993, abandoned.

[51] Int. Cl.⁷ ............................. G06F 17/60; G06K 15/00
[52] U.S. Cl. ............................ 705/27; 705/26; 345/352; 345/353; 345/355; 345/419; 345/427; 235/383; 235/385
[58] Field of Search ..................... 705/26, 27; 345/352, 345/353, 355, 419, 427, 962, 964; 348/12, 13; 235/383, 385

[56] References Cited

U.S. PATENT DOCUMENTS

| | | | |
|---|---|---|---|
| 3,328,803 | 6/1967 | Schwerin | 434/236 |
| 3,388,630 | 6/1968 | Leitner | 346/49 |
| 3,622,236 | 11/1971 | Novy | 353/86 |

(List continued on next page.)

FOREIGN PATENT DOCUMENTS

| | | |
|---|---|---|
| 1 211 969 | 2/1983 | Canada . |
| 0 118 043 | 9/1984 | European Pat. Off. . |
| 0 378 899 | 7/1990 | European Pat. Off. . |
| 2 177 245 | 1/1987 | United Kingdom . |

OTHER PUBLICATIONS

Dialog File 148, Acc. No. 03719636: Conhaim, "Online Shopping: A Beginner's Guide." Link–Up, v5, N6, p. 32(5) (8 pages), Nov. 1988–Dec. 1988.

Dialog File 148, Acc. No. 05875260: Anderson, "Into the 21st Century: High Tech, High Touch." Gifts and Decorative Accessories, v93, N5, p. 43(3) (4 pages), May 1992.

Raymond R. Burke et al., "Competitive Interference and Consumer Memory for Advertising," The Journal of Consumer Research, Inc., vol. 15, pp. 55–68, Jun. 1988.

Barbara E. Kahn et al., "Effects of Price Promotions on Variety–Seeking and Reinforcement Behavior," Marketing Science, v10, N4, pp. 316–337, 1991.

Robert J. Meyer et al., "The Optinality of Consumer Stockpiling Strategies, " Marketing Science, v9, N1, pp. 18–41, 1990.

Wilder, "Virtual Reality Seeks Practicality," Computerworld, v26, N17, p. 26, Apr. 27, 1992.

Lambert, "Multimedia: Hurry Up & Wait?" Multichannel News, Jun. 14, 1993, p. 69.

*Primary Examiner*—James P. Trammell
*Assistant Examiner*—Nicholas D. Rosen
*Attorney, Agent, or Firm*—Wolf, Greenfield & Sacks, P.C.

[57] ABSTRACT

A system for generating images representative of a store shelf includes a retail space management system for generating information describing product and shelf sizes and locations in three dimensions, and including a code which is unique to each product. The products are typically commodity goods. A product database is used to store images of product packages which are accessible using codes unique to each product. A three-dimensional modeling and display system which takes size and location information from the retail space management system and generates three-dimensional models of each shelf and product and accesses the product database using the codes provided by the retail space management system to obtain images for each product. It generates a display of each product on each shelf by combining the obtained images and the generated three-dimensional models. The consumer may manipulate the display to change what is being viewed, to examine product packages and to purchase products.

15 Claims, 18 Drawing Sheets

U.S. PATENT DOCUMENTS

| | | | |
|---|---|---|---|
| 3,757,037 | 9/1973 | Bialek | 178/18.01 |
| 3,826,871 | 7/1974 | Kraemer | 381/58 |
| 3,943,641 | 3/1976 | Dworetzky | 434/350 |
| 4,009,331 | 2/1977 | Goldmark et al. | 386/38 |
| 4,028,733 | 6/1977 | Ulicki | 386/121 |
| 4,073,368 | 2/1978 | Mustapick | 186/53 |
| 4,075,657 | 2/1978 | Weinblatt | 348/78 |
| 4,097,134 | 6/1978 | Jerie | 353/11 |
| 4,231,643 | 11/1980 | Demick et al. | 353/86 |
| 4,232,295 | 11/1980 | McConnell | 340/825.25 |
| 4,331,973 | 5/1982 | Eskin et al. | 348/13 |
| 4,896,210 | 1/1990 | Brokenshire et al. | 348/51 |
| 4,972,318 | 11/1990 | Brown et al. | 705/26 |
| 5,053,956 | 10/1991 | Donald et al. | 348/599 |
| 5,086,477 | 2/1992 | Yu et al. | 382/145 |
| 5,250,789 | 10/1993 | Johnsen | 705/14 |
| 5,383,111 | 1/1995 | Homma et al. | 705/27 |
| 5,475,585 | 12/1995 | Bush | 705/26 |
| 5,515,268 | 5/1996 | Yoda | 705/26 |
| 5,761,649 | 6/1998 | Hill | 705/27 |
| 5,790,713 | 8/1998 | Kamada et al. | 382/285 |
| 5,848,399 | 12/1998 | Burke | 705/27 |
| 5,936,630 | 8/1999 | Oxaal | 345/427 |

COMPUTER SYSTEM FOR ALLOWING A CONSUMER TO PURCHASE PACKAGED GOODS AT HOME

This application is a continuation of application Ser. No. 08/686,755, filed Jul. 25, 1996, U.S. Pat. No. 5,848,399, entitled COMPUTER SYSTEM FOR ALLOWING A CONSUMER TO PURCHASE PACKAGED GOODS AT HOME, and now pending, which is a continuation of application Ser. No. 08/159,335, filed Nov. 30, 1993, abandoned.

BACKGROUND OF THE INVENTION

There are several systems which have previously been used to allow consumers to purchase products from their homes. A first system involves displaying individual items of merchandise to a live television audience via a cable television channel, in the format of a typical television show. Consumers contact a purchase center via telephone to order a product. One problem with this method is that the products offered, and the order and time of their offering, are controlled and preselected by the producer of the television show. Because of this preselection, consumers must watch the television when the products they want to purchase are being presented. Currently, no cable television channels allow a consumer to select which products are being viewed.

A second system involves allowing a consumer to access, using a personal computer and a modem, an "on-line" computer service. In some instances, the consumer has a printed catalog available. When the consumer accesses the service, a textual description of product offerings is presented, usually in the form of a menu. There are a few textually-based grocery home shopping services which are still active including services provided by Peapod, based in Chicago, Shoppers Express, Harvest America and U.S. Order-Scanfone. U.S. Order-Scanfone provides a printed catalog with UPC codes which can be scanned by a pen, attached to a phone, called a "Scanfone". Numerous on-line shopping services for other merchandise are also available, such as Prodigy, CompUServe, Genie Services, and Comp-U-Card. While consumers are able to order products when they want to, it is very cumbersome to sort through a large number of products in a textual format. This method has been commercially tried without much success. Commercial failures of such systems have been attributed mostly to low consumer usage (probably due to the cumbersome text-based interface) which makes such a system uneconomical.

An interactive home shopping service available over cable television, TelAction, was at one time operative around the Chicago area. This service was also unsuccessful because of its cumbersome technology and unsatisfactory rate of return consumers. Products which were offered in a typical department store, such as clothing, were offered. The system used by this service is described in numerous patents assigned to Telaction, now dissolved, including U.S. Pat. Nos. 4,792,849, 4,829,372, 4,860,123, 4,905,094, 5,113,496, 5,119,188, 5,191,410, 5,195,092, and 5,208,665 all of which are incorporated by reference. In the Telaction system, a number of video presentations, one for each product, were combined to form segments, or product groups, which are interconnected by a computer data structure, specifically a tree. This tree and the video information were stored on a video disk. There are a number of permissible paths among the video presentations, and the consumer may select which paths to follow through the video presentations. The video presentations represent different areas of a store. Each node in the network includes one or more video segments, each segment being one or more video images (still pictures) and possibly one or more audio images (audio messages). Navigation of the tree is permitted by menus, and was intended to closely resemble the experience of being in an actual store. A product file stores product information which may be presented to a consumer in order to allow the consumer to purchase a product.

A variety of services other than shopping are currently available as interactive television systems. For example, Interactive Television Systems, Inc. has a system which uses an FM radio signal primarily to transmit and run interactive games. Such a system is described in U.S. Pat. Nos. 5,181,107 and 5,051,822.

Generally, previous home shopping services have failed because of the lack of both ease and flexibility in the selection of products. Also, the products offered were often of the type which consumers would rather buy in person, such as clothing. In order to improve the success of an interactive home shopping service, consumers must be willing to purchase the offered products at home. Also, the interface of the system should facilitate selection of a variety of offered products by allowing flexibility in selection and by providing sufficient information to enable an informed selection.

SUMMARY OF THE INVENTION

The invention is a system and method which allows a consumer to purchase products, typically packaged commodity goods, from home. The system generates an image representative of a store shelf which is displayed to a consumer, for example, on the consumer's television set. The image thus preferably includes images of multiple product packages. The consumer may manipulate the view by zooming in or out, or by panning left or right. The consumer can select a product shown on the display to view the product packaging in more detail, to rotate the package, to view the ingredients of the product, or to purchase the product. These functions are performed in response to a consumer's input from an input device, such as a remote control for the television or other mechanical user interface.

A retail space management system generates information describing product and shelf sizes and locations in three dimensions, including a code which is unique to each product. A product database stores images, prices and other information of products which are accessible using codes unique to each product. A three-dimensional modeling and display system takes size and location information from the retail space management system and generates a three-dimensional model of objects representative of each shelf and product. It also accesses the product database using the codes provided by the retail space management system to obtain images for each product. The image of the store shelf, including each product on each shelf, is generated and displayed by combining the obtained images and the generated three-dimensional models.

The consumer's actions are preferably recorded for subsequent analysis for market research.

DETAILED DESCRIPTION

The present invention will be more completely understood through the following detailed description which should be read in conjunction with the attached drawing in which similar reference numbers indicate similar structures. All references cited herein, including all U.S. patents, manuals for commercially available computer programs and all other publications, are hereby expressly incorporated by reference.

A system which allows a consumer to purchase products at home should be limited to those products which a consumer would not need or want to buy in person. Such products are typically packaged products and commodity goods such as cereals, paper towels, soft drinks, and other goods which a consumer does not need to inspect before purchasing, and are often sold in supermarkets.

Figure 1:
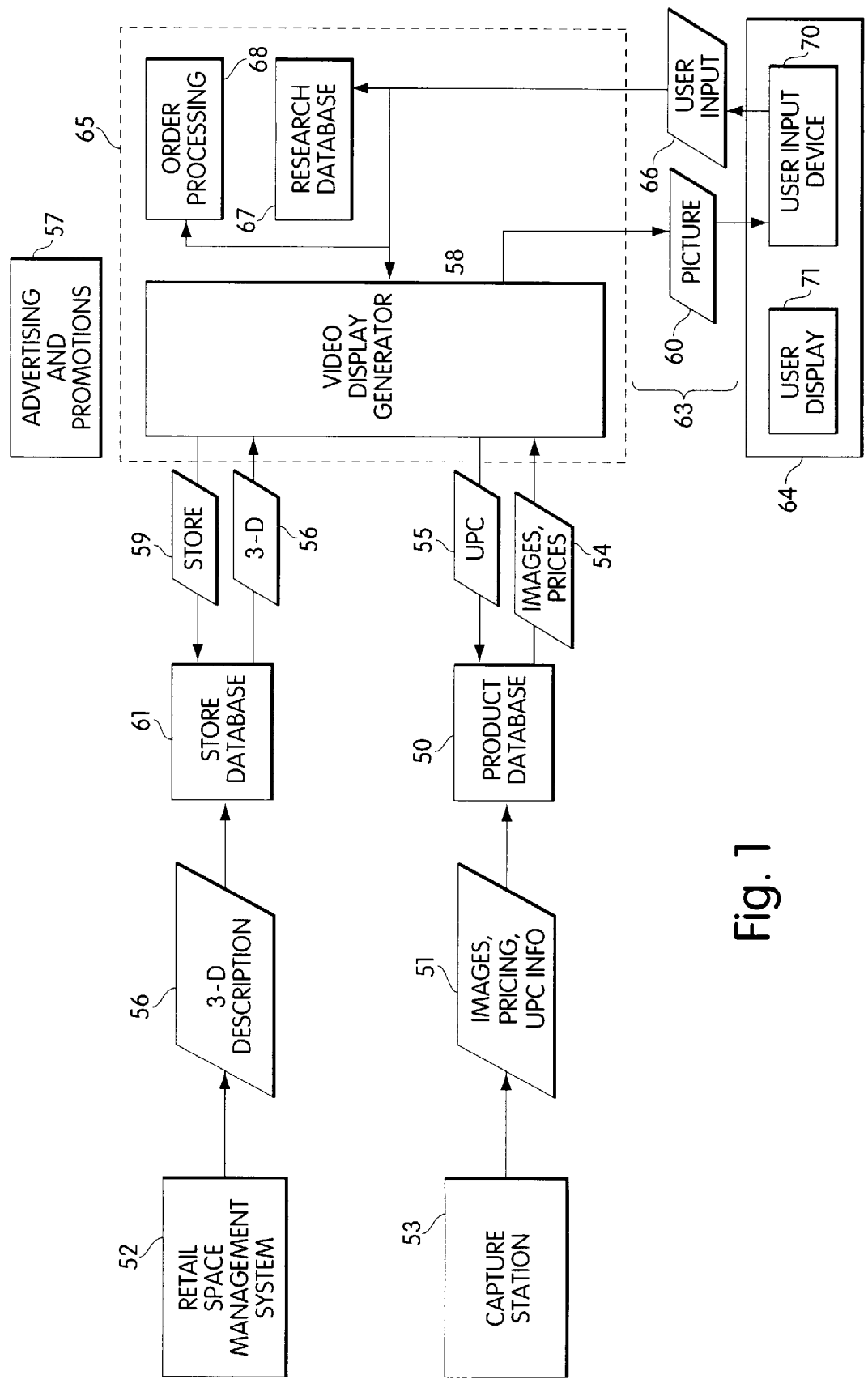
FIG. 1 is a general block diagram of a system in accordance with the present invention.

FIG. 1 is a general block diagram of a system for allowing a consumer to purchase such goods at home. The system includes a product database 50 in which images and prices of a large number of packaged products are stored in digital format. A large supermarket may carry about 20,000 to 30,000 brands and types of packaged products; there are about 50,000 kinds of packaged products produced in the United States. Thus, up to about 50,000 products could be stored in this product database 50 to allow this system to handle all products made in the United States. Digitized images are stored for each important package face. For example, front, back and side faces are typically stored for boxed packages, whereas the top and bottom box faces typically need not be stored. Front and back faces, i.e. each half of a label, of a bottle or other cylindrical object are also stored. For products which have ingredients and nutritional information on the package, a high resolution image of the package face having the ingredients is stored. Information regarding any promotions made by the manufacturer or other special indications may also be added. For each packaged product, the images, prices and other information 54 are accessible in the database by using the universal product code (UPC) 55 for the product. Because the database is accessed by the UPC code of a product, any product can be added or deleted from the shopping service and prices can be readily assigned or changed.

A database system suitable for use as product database 50 is 1-800-DATABASE, managed by MarketWare Corporation of Norcross, Ga. This database is industry-wide and is supported by three trade associations in the United States of America. Three other databases are also managed currently, however, the image quality on these other databases is lower, and do not include high resolution images of the ingredients portions of packages. One of these databases is the National Product Library (NPL) maintained by Information Resources, Inc. and includes products in the food, health and beauty care areas. The Universal Product Database is similar to NPL and is maintained by Gladson & Associates. A. C. Nielsen also maintains a similar database.

The product database 50 is maintained by obtaining images from a capture station 53 and by receiving pricing information and UPC codes from the manufacturer. Although it is possible for a manufacturer who wishes to sell products on this system to send the images, prices, other information and UPC codes 51 directly to the company managing the database, a manufacturer typically sends all new products to the company managing the database for imaging and archiving. The capture station 53 uses a digital video camera to obtain a high resolution digital image of each package, which is typically in TARGA format.

CAPTURE, a proprietary system available from MarketWare Corporation, is a suitable system for use as capture station 53 to obtain images from packages. Information Resources, Inc., MarketMAX and A. C. Nielsen also have commercially available products which can capture images of products and packaging.

The system of this invention also uses a description 56 of the space of a retail store, which description is preferably three-dimensional and readily generated by using a retail space management system 52. A suitable retail space management system 52 is PEGMAN, a retail space management system which is commercially available from MarketWare Corporation. Other retail space management systems are also available, including APOLLO from Information Resources, Inc. of Chicago, Ill.; SPACEMAN II and III from Nielsen Software and Systems of Irving, Tex.; $PACEMAX from Marketmax, Inc. of Danvers, Mass.; QICSPACE from the Citation Group, Limited of Buford, Ga.; INTERCEPT from Intactix International of Manhattan Beach, Calif.; SHELF MANAGER 2000 from Graphical Data Analysis, Inc. of Athens, Ga.; and ACCUSPACE from Marketing Resources, Inc. of Indianapolis, Ind. A product called InterSpace allows datafiles in the format for one of these commercially available products to be translated into the format of another one of these commercially available products.

A retail space management system allows a retailer or other person to design a store layout, shelf by shelf. Information needed to use these programs can be created from scratch by auditing an actual store with a notebook computer and scanner wand (which captures UPC codes), or can be translated from the data files from any retail space management system currently used by the retailer by using InterSpace. An output of the retail space management system 52 is a three-dimensional description 56 of the store space, including product descriptions (UPC information), shelf and product sizes and locations in three spatial dimensions, and product category locations, preferably in Cartesian coordinates. Typically, the description 56 includes a floor plan which indicates the location and sizes of each product category within the store. A file is also generated for each product category, indicating the product and shelf sizes and locations for the product category. This description 56 can be stored in a store database 61, accessible by an indication of the store 59 which it describes. For example, the database may be an electronic file system where each store is assigned a directory. In the directory, a file called "floor plan" includes the floor plan information. A file for each product category is also provided and given the name of the product category, e.g., "cereals".

The images and price information 54 from the image database 50 and three-dimensional description 56 for a store 59 from the store database 61 are used by a shopping service 65 which operates on a multi-server computer. The shopping service (and therefore, the multi-server computer) 65 is connected to a consumer's access system 64 via a connection 63.

A video display generator 58, part of the shopping service 65, generates a picture 60 which is transmitted to the display 71 of the consumer's access system 64. The picture 60 is similar to a "planogram", which is a visual representation of a store shelf, such as a picture of a shelf with products on it. Advertising and promotion data 57 may also be added to the picture 60 generated by the video display generator 58. Such data 57 may include coupons, special discounts, indications that an item is new, and other promotional information. The products are organized in the picture 60 by category as they would appear on a shelf in an actual store, as will be described in more detail below.

This shopping service 65 may be supported by a cable television system, telephone system or other computer network. When the shopping service 65 is supported by a cable television system, the multi-server computer is typically located at a local cable company's headquarters. The consumer's access system 64 typically includes a television 71 and a remote control device 70 which allows consumer to input information to a cable box provided by the cable company. The connection 63 between the cable company and the consumer is a cable network or two-way fiber optic system.

In another instance, the multi-server computer may communicate with a personal computer which acts as the consumer's access system 64. The consumer's input device 70 may be any of a mouse, trackball, keyboard, touchscreen or other input device for a computer. The consumer's display 71 is typically a cathode ray tube or other type of computer display for the personal computer. The consumer accesses the shopping service 65 running on the multi-server computer via a modem and telephone line which provides the connection 63 between the multi-server 65 and the consumer's access system 64. This system may also be operating on a multiuser computer system, where a main multi-server computer running the shopping service 65 is accessible by multiple consumers using other computers via a computer network.

The multi-server computer is a client/server computer at the head-end of the cable system, such as those which are now being developed for video on demand services. A suitable multi-server computer system is a workstation type computer with significant graphics capabilities such as those available for Silicon Graphics. A computer program may be written in C and utilize a three-dimensional modeling system such as the WorldToolKit available from Sense8, which can be used on many computer platforms. PhotoVR, from Straylight of Warren, N.J., or other three-dimensional modeling systems may also be used. It is also possible to use a personal computer such as that which is compatible with an IBM PC with an Intel 486 processor for a personal computer-based system. This system preferably uses a Pharlap-DOS extender and is programmed using MetaWare High C/C++. A FireCard graphics accelerator board, based on an i860 microprocessor, commercially available from Spea, is preferably used.

It should be understood that multiple consumers may use the shopping service 65 simultaneously, but view different products and different product categories as they choose. Such multiple access and use is made possible by using commercially available multi-server computers. That is, a multi-server computer may run many programs at once, one for each consumer, or a consumer's access system 64 may have the capability of running the shopping service 65 which would be downloaded to it by the multi-server, such as may be done with video games.

The video display generator 58 includes three-dimensional modeling system which allows for the creation, display and manipulation of three-dimensional objects. This system takes the three-dimensional description 56 generated by retail space management system 52 for a given store 59 and generates a three-dimensional model of manipulable objects. UPC information 55 obtained from the retail space management system 52 is used to access the product database 50. The three-dimensional model is then combined with the images and price information 54 obtained to create the picture 60. A suitable three-dimensional modeling system for this purpose is the Sense8 WorldToolKit, Version 2.0. This system includes a library of computer commands which allow the manipulation of the displayed objects in three-dimensional and facilitates the programming of the computer system. Images are combined with the models by being treated as surface texture. The use of this tool kit for these purposes is described in its Reference Manual.

The consumer may manipulate what is being viewed on the display 71 in order to find, view and purchase goods, by accessing the shopping service 65 via an input device 70, such as a remote control. The video display generator 58 responds to movements of a cursor on the display 71, which the consumer can use to move items around on the shelf, examine a product with a close-up view and select a product for purchase. In response to the consumer input, the video display generator 58 generates a new picture 60, if necessary, as will be described in more detail below.

Consumer inputs 66 received from the consumer by shopping service 65 are also sent to an order processing and billing system 68 (only for purchases) and to a research database 67. The order processing and billing system 68 sends ordering information to a warehouse where a consumer may pick up an order or from which a delivery of an order is sent to the consumer. The research database 67 stores all of a consumer's actions and is used for analysis and tracking of purchasing behavior. The research database 67 tracks consumer's actions in a manner which is transparent to the consumer.

The operation of this system will now be described.

Figure 2:
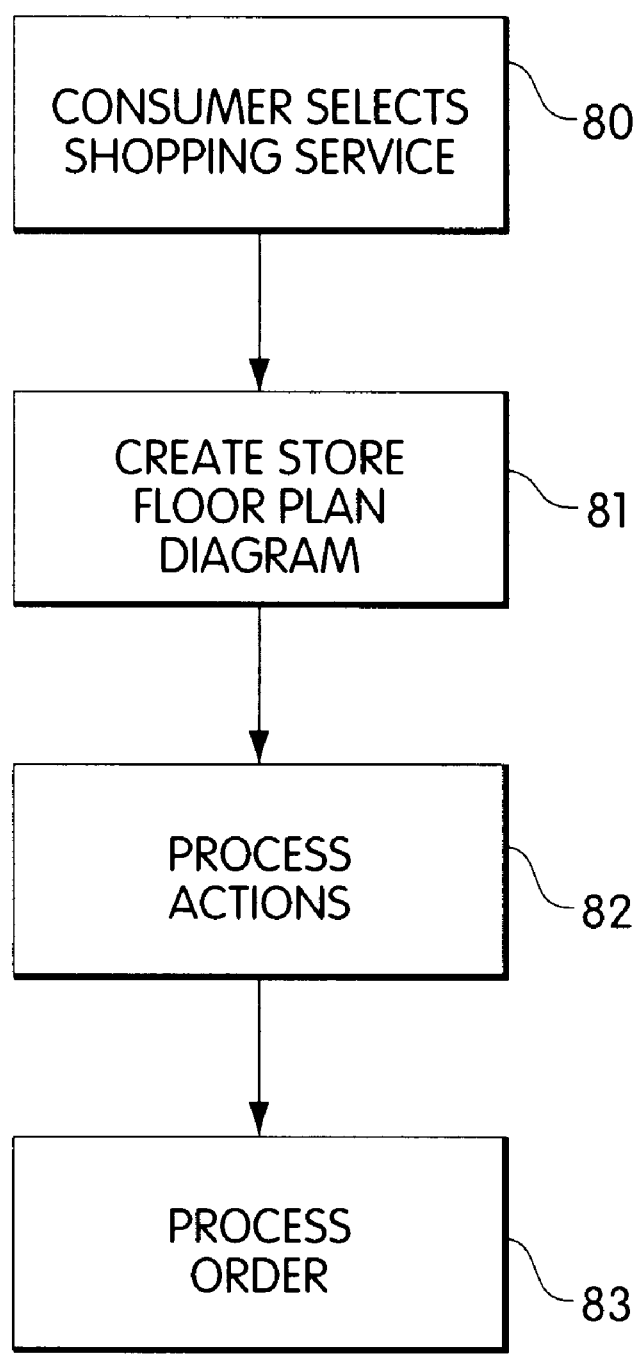
FIG. 2 is a flowchart describing an overview of the operation of the system of FIG. 1.

The first step 80 (FIG. 2) of this operation is the consumer's access to and activation of the shopping service 65 for a selected store 59. This step is performed by the consumer, for example, by calling a predetermined telephone number of a cable operator or other entity providing the shopping service. On a cable television supported system, this selection can be done in the same way that many pay-per-view services are provided. Upon selection of the shopping service 65, the multi-server creates a new instance of the shopping service 65 to run on the multi-server which reads the appropriate three-dimensional descriptions 56 of the selected store 59.

A floor plan is then constructed for the selected store 59 in step 81, and an initial graphical image (picture 60) representative of the floor plan is generated. The steps involved in constructing the floor plan will be described in more detail below. The system is then ready to process actions taken by the consumer in step 82, as will be described in more detail below. When the consumer indicates that no more actions will be taken, the shopping service 65 is terminated and the consumer's order, if any, is processed by order processing system 68.

Figure 3:
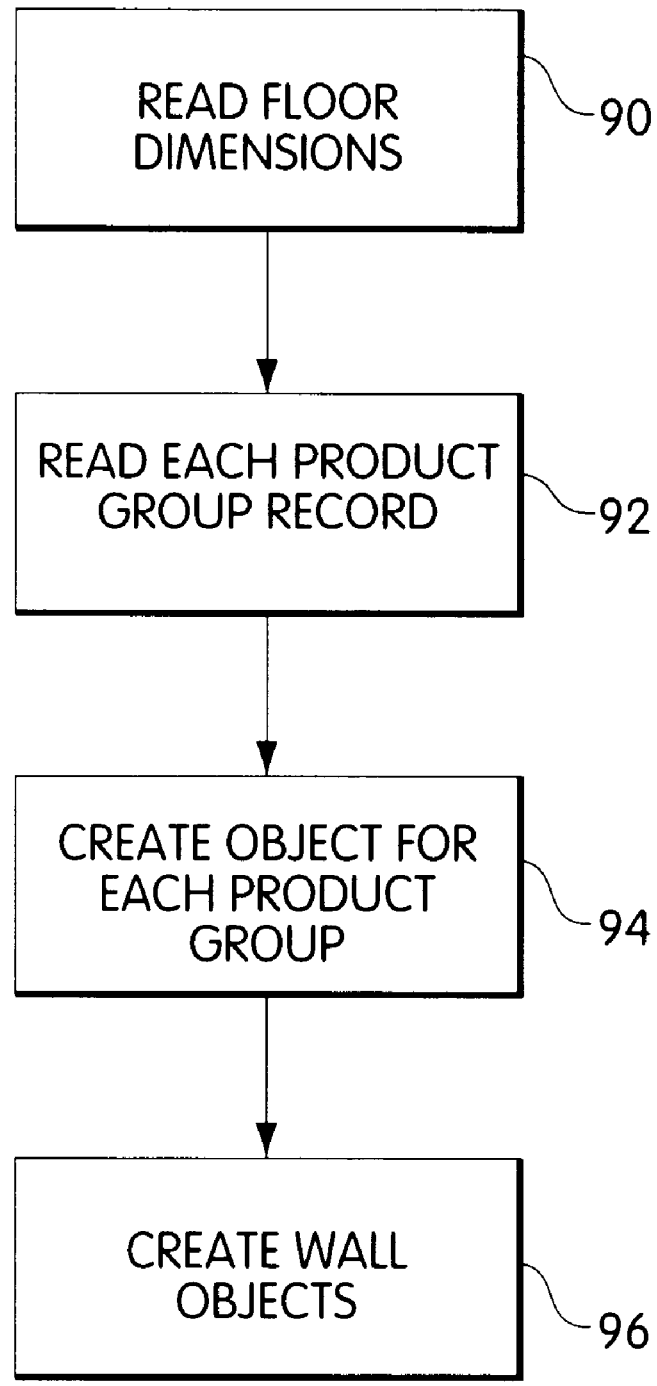
FIG. 3 is a flowchart describing how a floor plan of a store is created.

The construction of the floor plan will now be described in more detail in connection with FIG. 3.

In order to construct a floor plan, the three-dimensional description 56 of the retail store should include a definition of the units of measure, dimensions of the floor and walls, a record of each product group in the store, where each record including the name of the product group, and the size and location of shelf units in three dimensions with respect to the floor plan.

Figure 13:
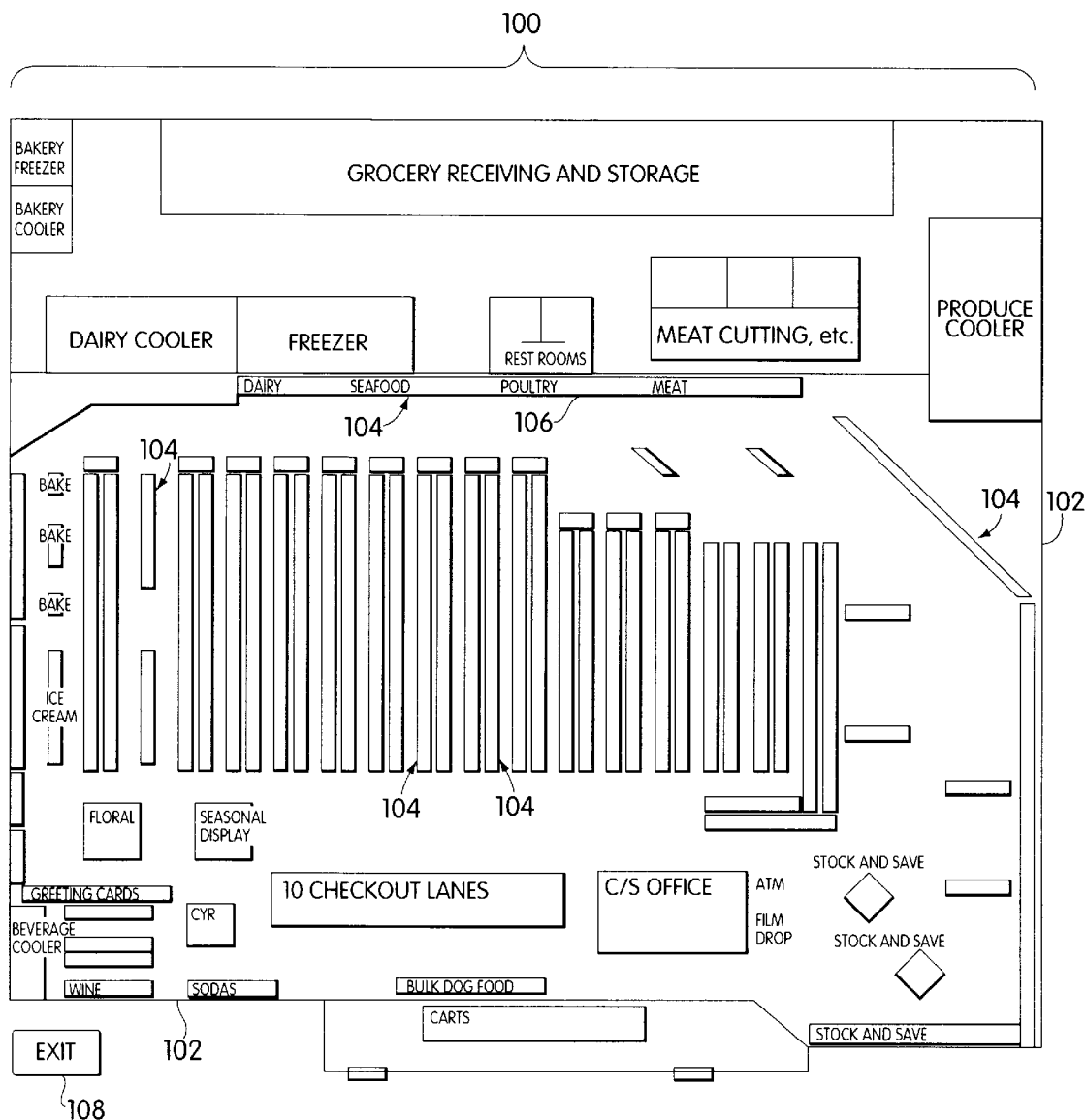
FIG. 13 is a display of a floor plan of a store.

The construction of the floor plan involves first reading the dimensions of the floor (step 90). These dimensions are two (X,Y) coordinate pairs. The record of each product group is read to position the product group on the floor plan (step 92). An object is created for each product group (step 94) using the dimensions of the product group and its location in the store which is done by using the three-dimensional modeling system. The combination of the floor plan dimensions and product group locations and dimensions are used to construct either a two-dimension or three-dimensional model, which is both representative of the floor plan and which has manipulable objects. A manipulable object is thus created for each product group. Objects may also be created for each wall (step 96). Graphics are preferably used to texture the floor plan objects to provide a better simulation of a view of a store. The top of each product group object is preferably textured with text to identify the product group. This three-dimensional model can then be displayed as is shown in FIG. 13. The floor plan 100 includes walls 102 and product groups 104. Each product group 104 has a label 106, e.g. "laundry supplies".

Figure 4:
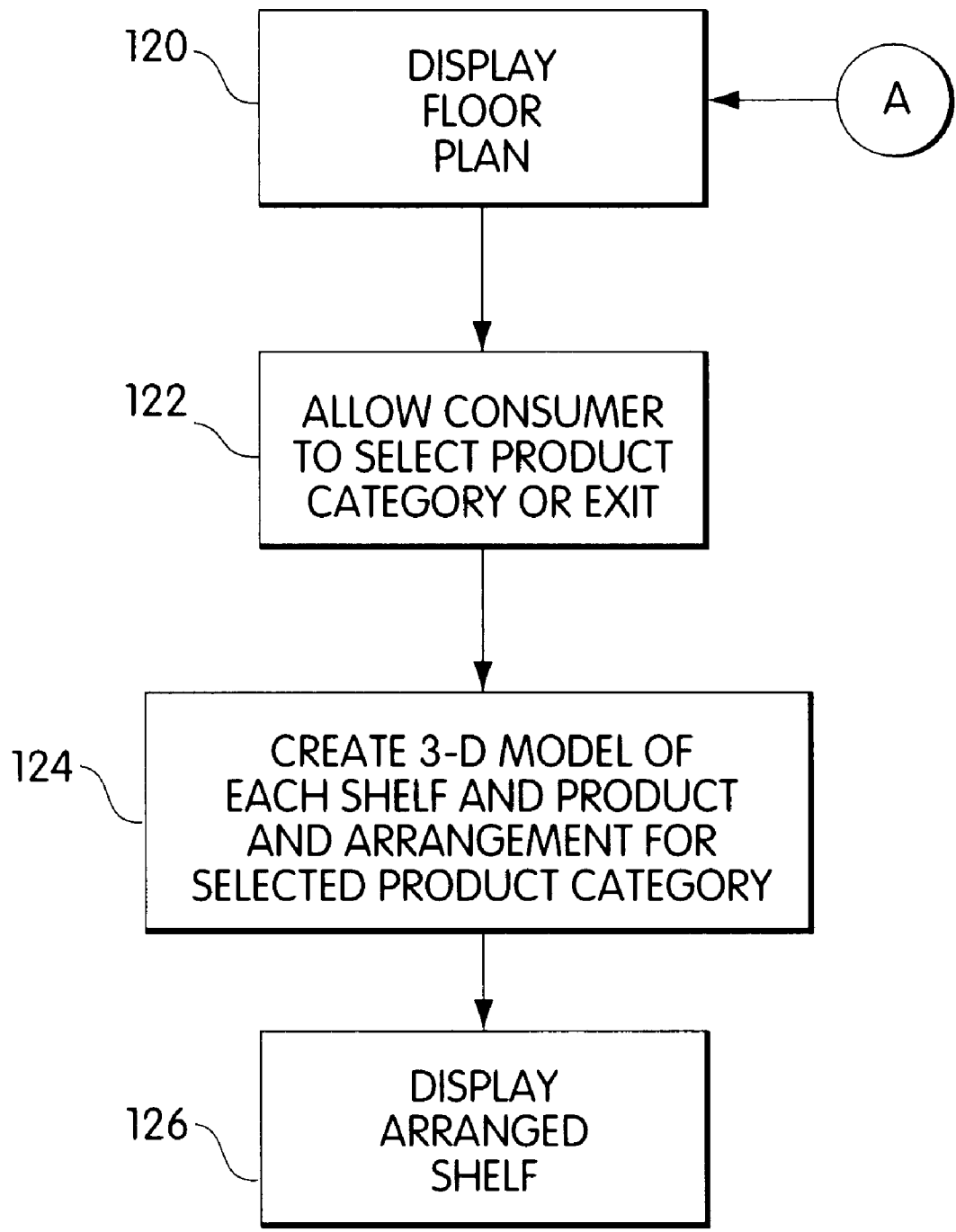
FIG. 4 is a flowchart describing how a consumer selects a product group.

When a floor plan has been constructed from the description of the store 59 selected by the consumer, an image of this floor plan (e.g. FIG. 13) is displayed in step 120 (FIG. 4), to the consumer. The consumer is then allowed to select a product category or exit the shopping service in step 122, by placing a cursor on the display on the product category 104 of the displayed floor plan or an exit icon 108 and by touching a selection button. Alternatively, it is possible to forego the construction of a floor plan and provide a menu of possible product categories for selection by the consumer.

Figure 7:
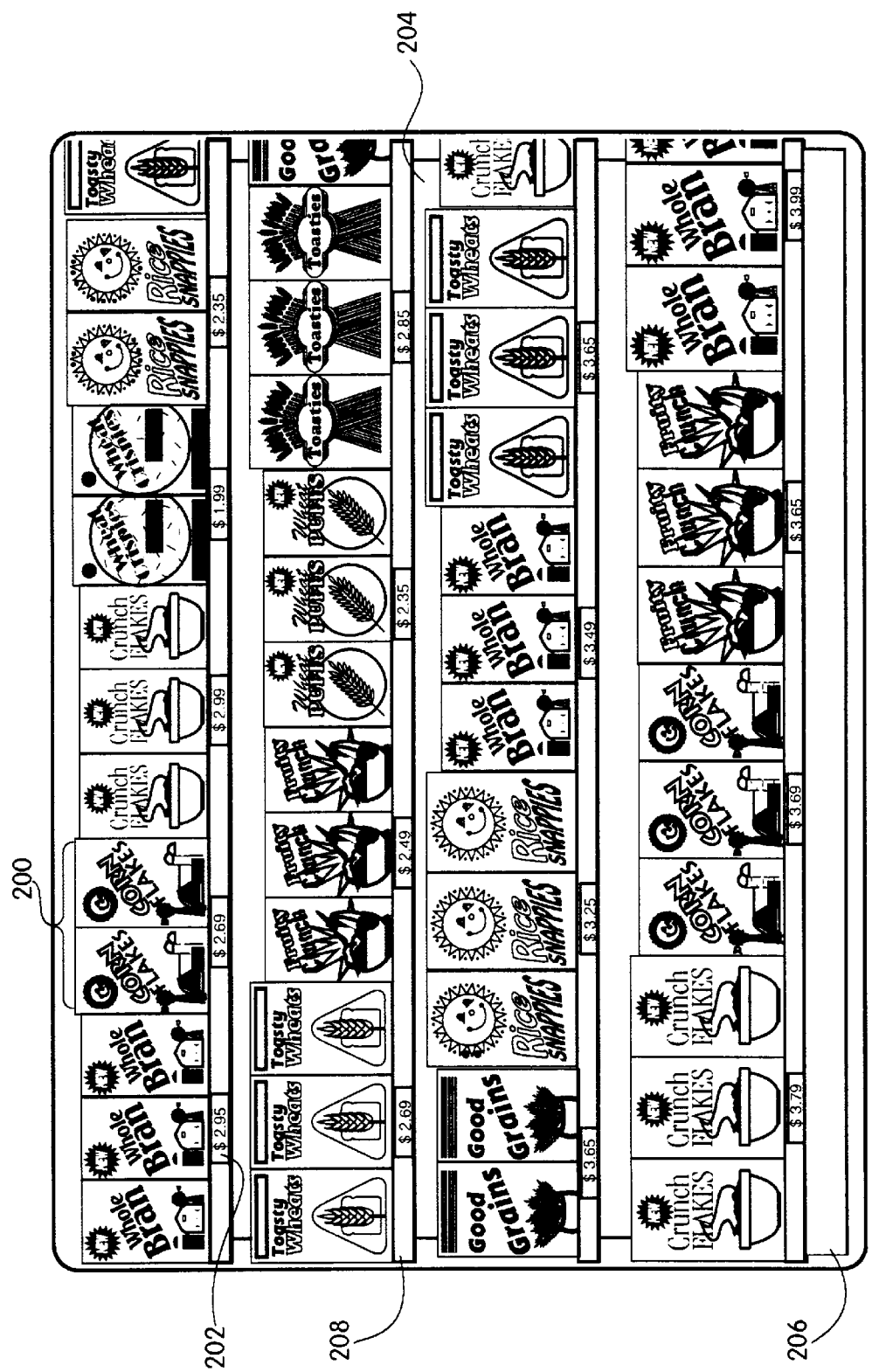
FIG. 7 is a display of a store shelf as initially displayed to a consumer.
Figure 14:
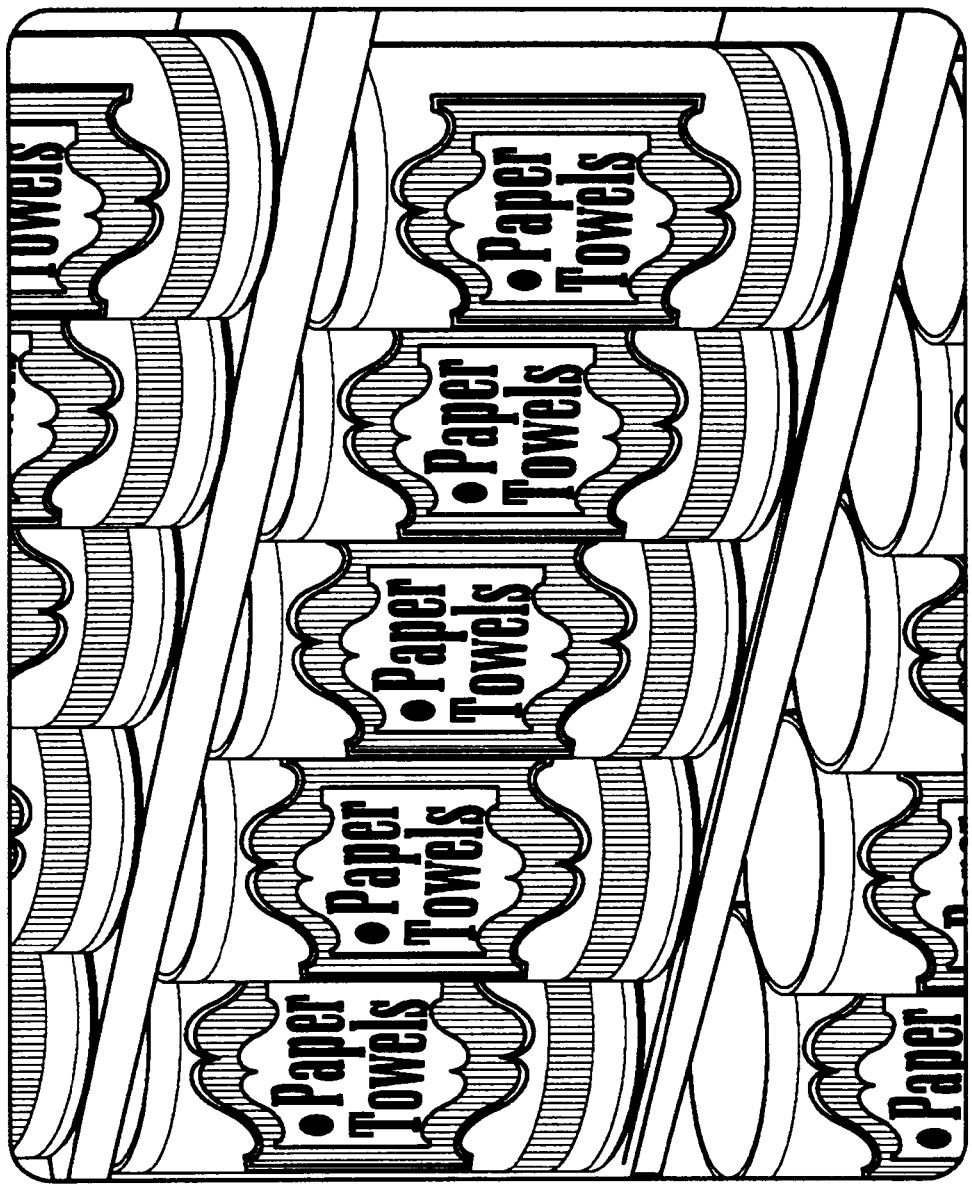
FIG. 14 is a photograph of an aisle of paper towels in an actual store.
Figure 15:
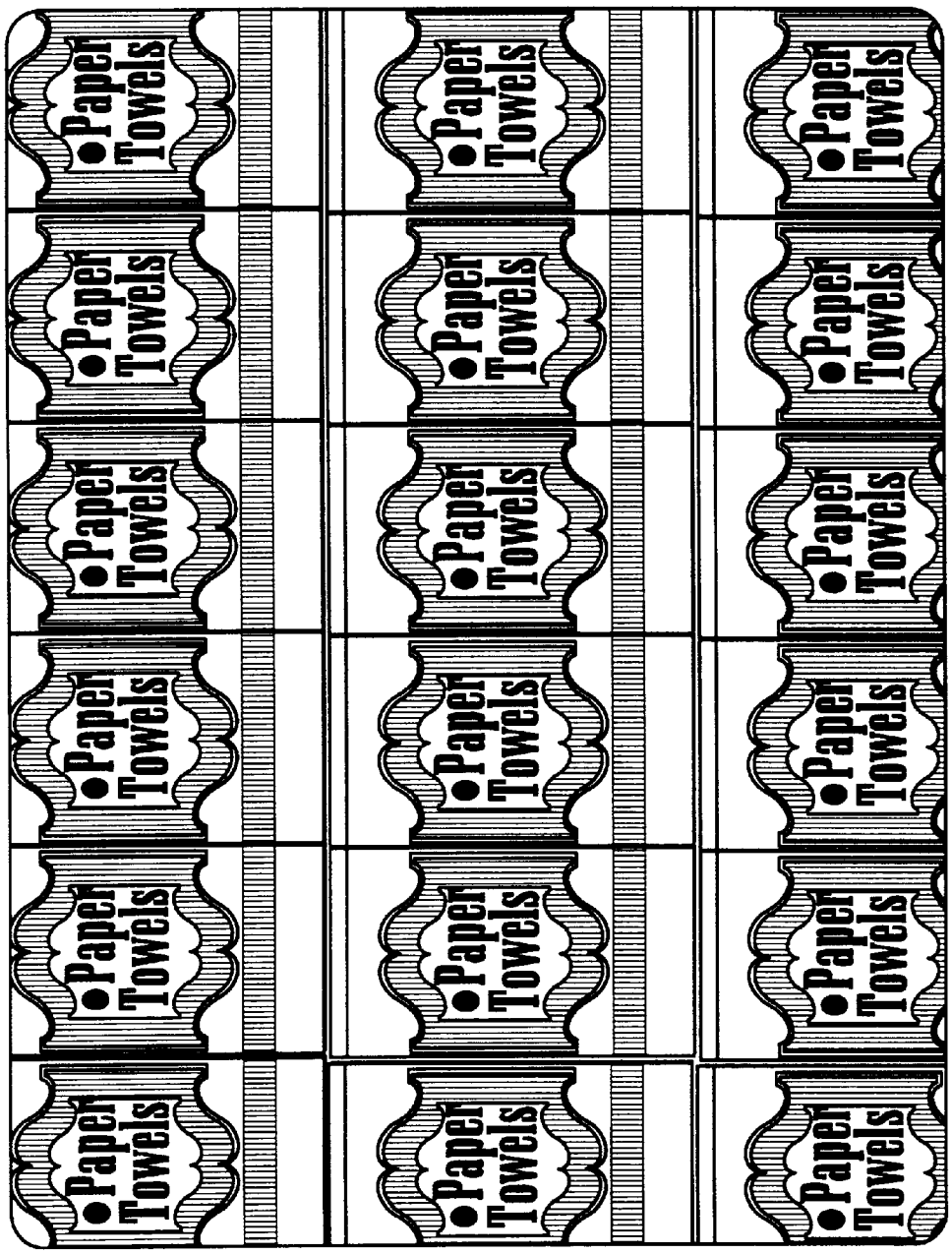
FIG. 15 is a photograph of a display, as viewed by a consumer with the system of an embodiment of this invention, of the same aisle of the store shown in FIG. 14.
Figure 16:
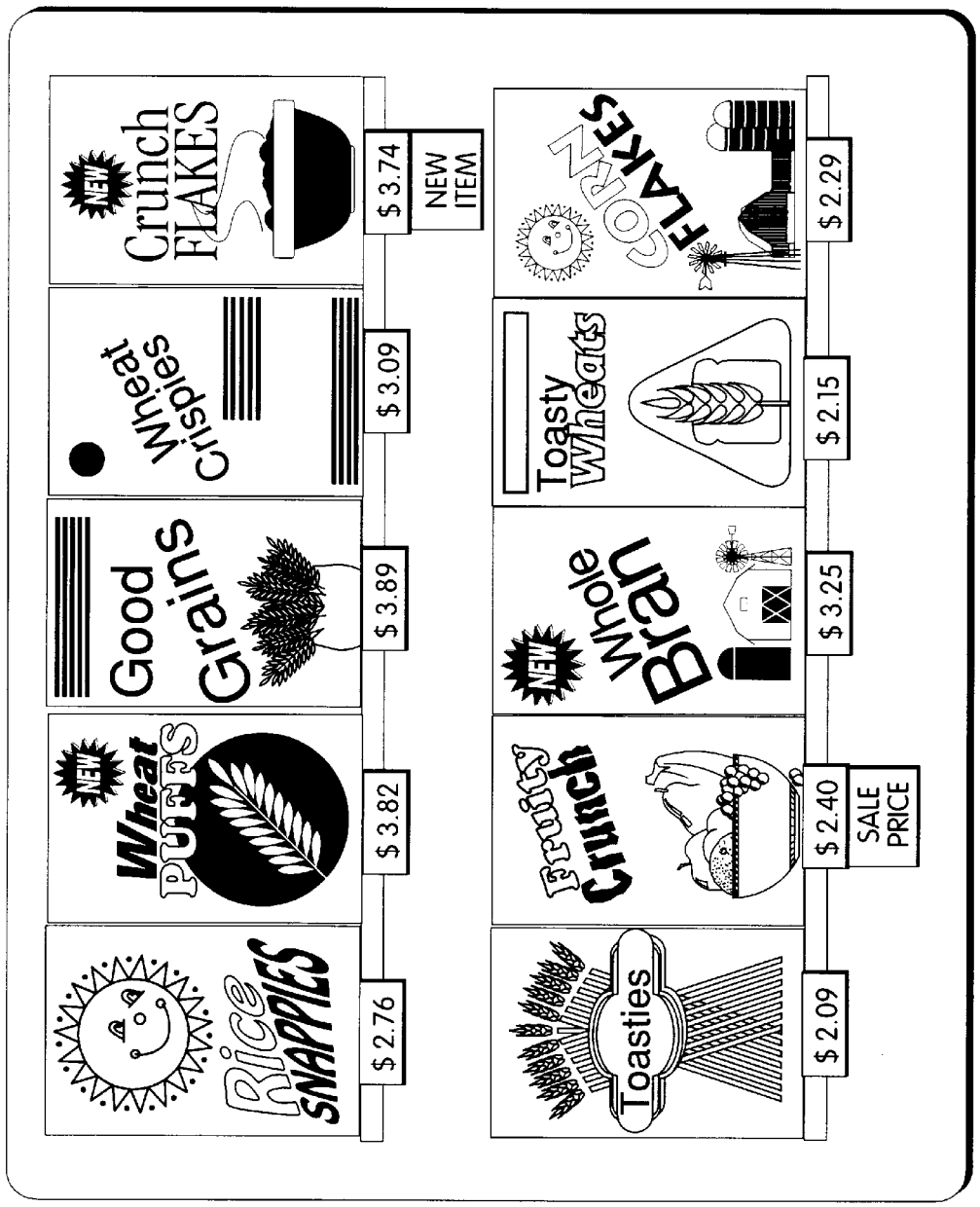
FIG. 16 is a photograph of a display, as viewed by a consumer, of shelves of cereal boxes.
Figure 17:
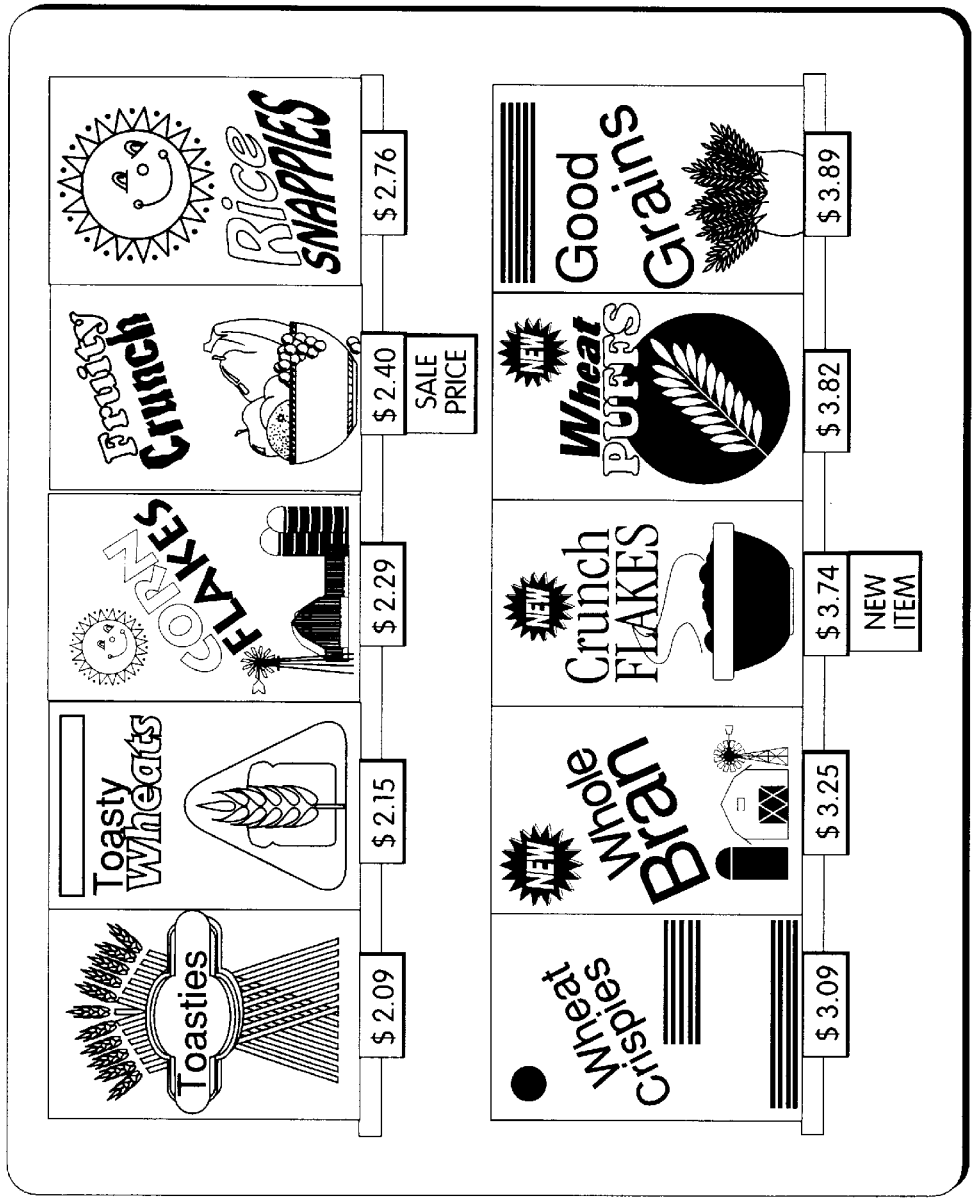
FIG. 17 is a photograph of a display, as viewed by a consumer, of the shelf of FIG. 16, with products rearranged according to price.

In response to a selection of a product category, the data file for the selected product category is accessed from store database 61. A three-dimensional model of each shelf and product, and the arrangement of the shelves and products for the selected product category is generated in step 124. A picture 60 is then generated and displayed to the consumer in step 126. A typical displayed product category is shown in FIGS. 7, 15 and 16. The displayed product category includes a number of items of each product 200, a price 202 for each product, a backboard 204, a base 206 and shelves 208. The displayed product category appears to be very similar to what a consumer would actually view in a real store, such as shown in FIG. 14.

Figure 18:
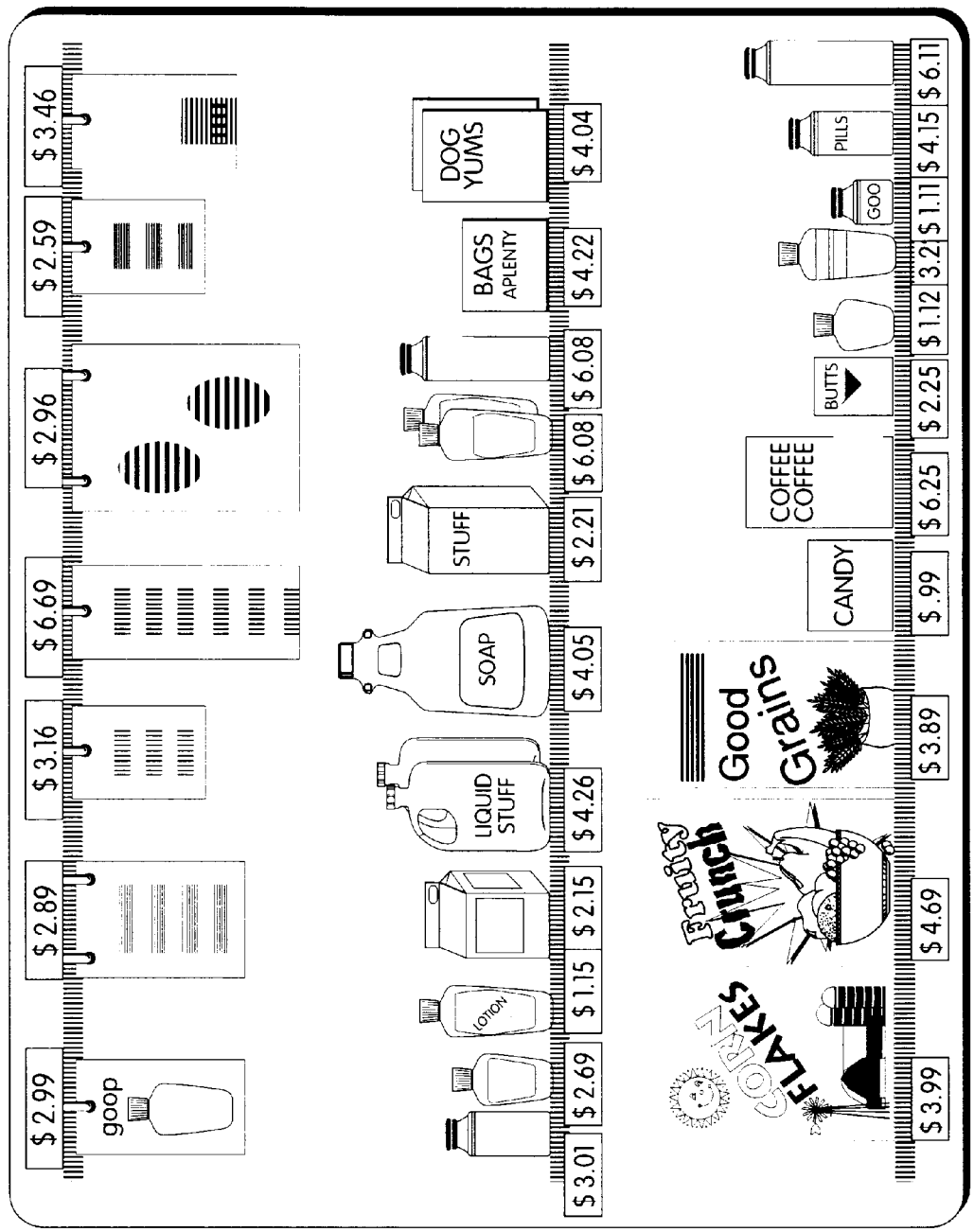
FIG. 18 is a display of shelves of products representing a consumer's last shopping trip.

The system may also be arranged to display certain screens rather than product categories upon consumer selected options. For example, groups of all products purchased last week (as shown in FIG. 18), all products on special, all products needed for a specific recipe, or only new products now available could be displayed. Items in the selected product category may also be rearranged on the shelf, upon request by the consumer, according to price (as shown in FIG. 16), brand, manufacturer, sub-category or other information which may be stored for each product in the product database 50.

Figure 5:
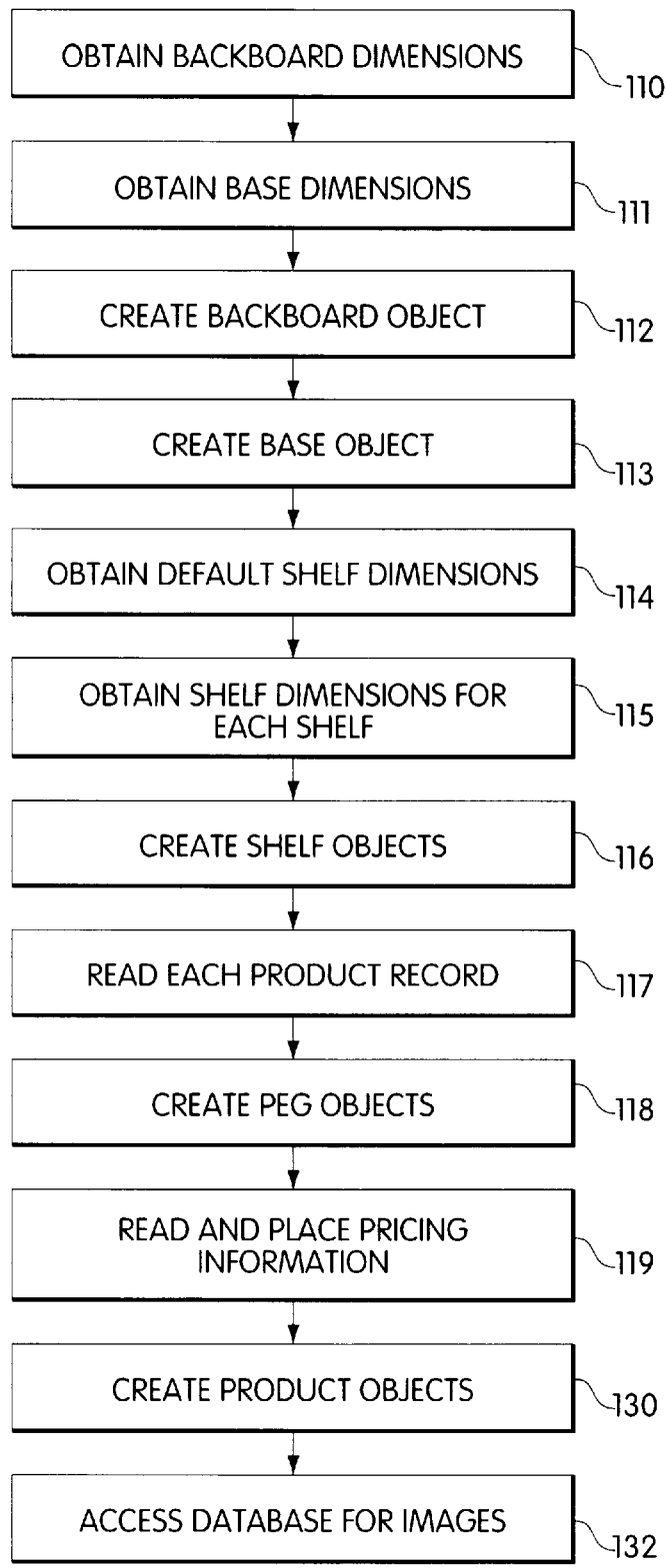
FIG. 5 is a flowchart describing how a three-dimensional model of a shelf and products on the shelf is created.

The creation of the three-dimensional model for a product category will now be described in more detail in connection with FIG. 5.

A file for a product category is accessed to obtain the dimensions and locations for the shelves and products. First, the backboard dimensions for the shelving unit are obtained, including the height and width (step 110). The base dimensions of a shelving unit, including its height, width and depth are then obtained (step 111). An object is then created in step 112 for the backboard of the shelving unit, using the width and height obtained for the backboard and the depth of the base, by using the three-dimensional modeling system. An object for the base is then created in step 113 using the width, height and depth information for the base and the height of the backboard and with respect to the origin. These objects are textured using a predetermined color or other graphics.

The default dimensions for a shelf are then obtained in step 114, including height, width, depth and offset information. Default peg lengths are also useful for objects placed on pegs and are read at this time. Next, a record for each shelf is then obtained in step 115 which include X and Y locations, height and width and depth information, an identifier, the angle of tilt of the shelf, an offset, and a lip height. The front and rear coordinates in the Z direction are calculated according to the difference between the base depth and the sum of the shelf depth and shelf offset (in the front) and the difference between the base depth and the shelf offset (in the rear). An object is then created in step 115 based on the width, height, depth, X, Y and Z dimensions for each shelf (step 116).

Next, the record of each product is read (step 117). Each record includes the height, width and depth of each product as well as the nesting height, width and depth for that product. The nesting refers to how many products are stacked on the shelf in the three spatial dimensions. Also, the peg left, top, width, offset and length dimensions are also read, if any, for the product. If the read peg length is zero, the peg length is set to the default peg length. The front and rear coordinates of a peg are calculated by the difference between the base depth and the sum of the peg offset and peg length (for the front) and the difference between the peg offset and the base depth (for the rear). Pricing and other information for each of the products is then obtained. Objects are then created for each peg based on the peg information, if any (step 118). Information obtained on the pricing and other information are used to complete the shelving unit objects by being placed on the edges of the shelves (step 119). Next, the objects for each of the products are created (step 130). The database is accessed in step 132 to obtain the front image of each product object which is at the front of the display. The first object on the display is textured with the front face image obtained from the product image database. Buttons are also created to allow for consumer input, such as an "Exit" button as shown at 210 in FIGS. 9–12, the purpose of which will be described below. These buttons are also displayed to the user. The textured model is now displayed to the user (see step 126, FIG. 4).

Figure 6:
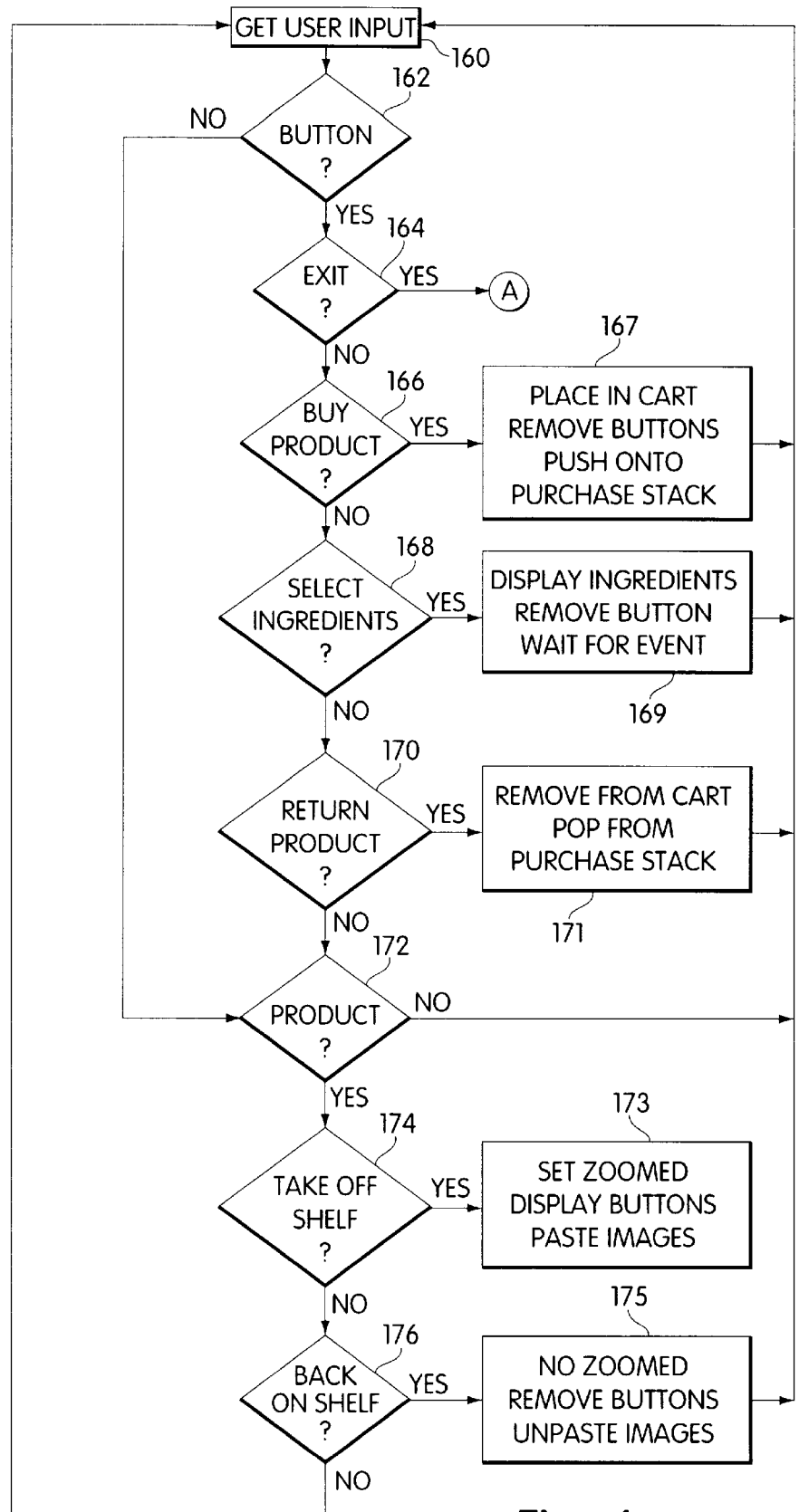
FIG. 6 is a flowchart describing how consumer actions are processed to provide different views and to allow a consumer to purchase products.

The processing of consumer actions (step 82 of FIG. 2) will now be described in more detail in connection with FIG. 6. The consumer first reviews all of the products of a category on the shelf which are displayed as shown in any of FIGS. 7, 15 or 16.

Figure 8:
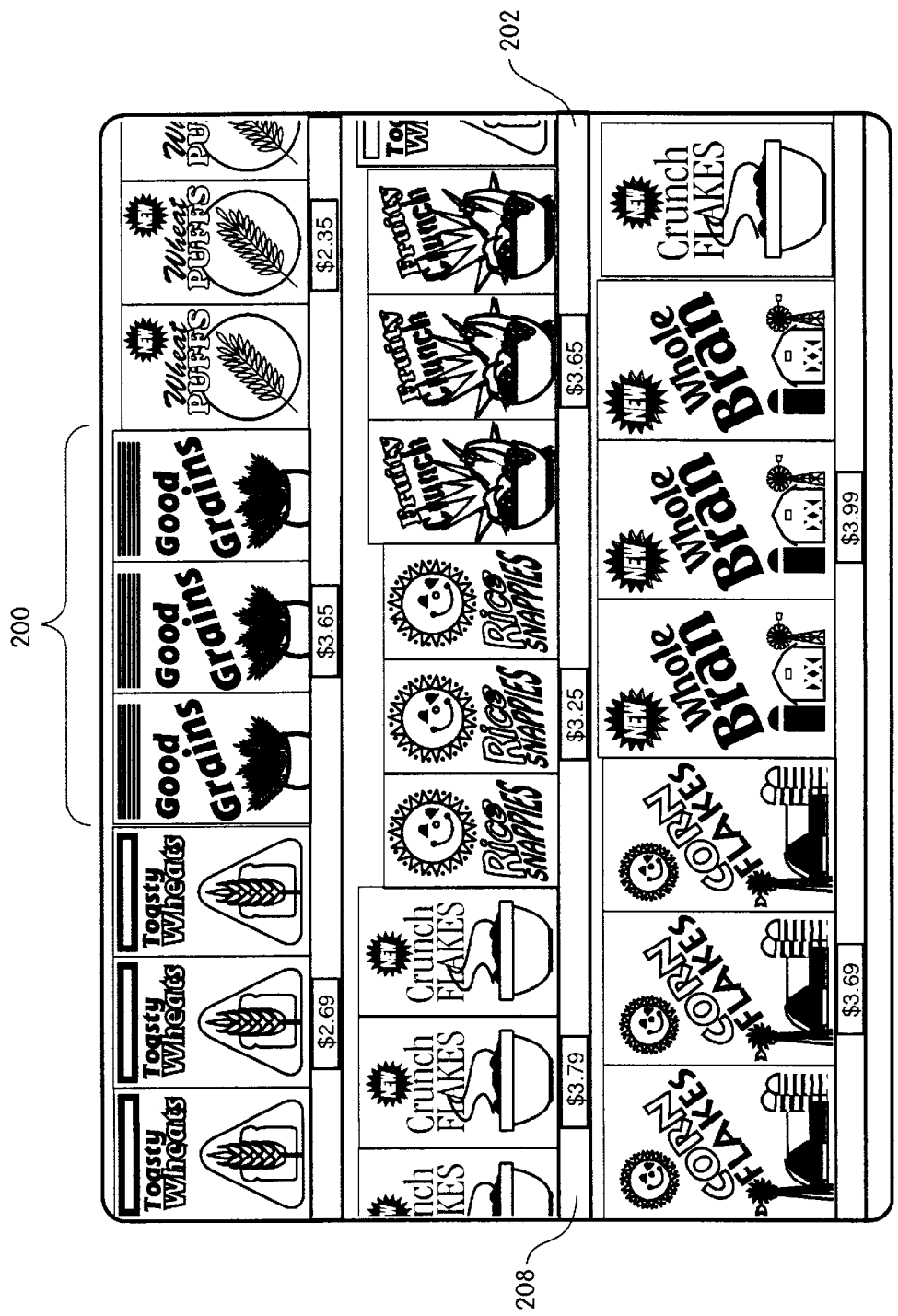
FIG. 8 is a display of a close-up look at a store shelf.

Processing of consumer actions begins with step 160 of obtaining a consumer input from the consumer. The consumer, by manipulating the input device, may zoom in or out to view different portions of the display. For example, trackball motion to the left and right may move the view of the shelf to the left and to the right, whereas forward and backward motion may move the view forward and backwards. A zoom-in view is shown in FIG. 8. When a television remote control is used as the input device, buttons on the remote control are dedicated for the purpose for zooming in and out and panning left and right. The trackball motion or the suppression of buttons on a remote control device is detected in a manner known by those of skill in the computer programming art. The movement of the view in response to these detected actions is performed by using the library of commands from the Sense8 WorldToolKit as instructed by its reference manual.

It is then determined, in step 162, whether an icon button or product has been selected by the placement of a cursor on the product or icon button and the suppression of a button on the input device. These two actions are performed together with a touchscreen. As an alternative to icons, a predetermined button may be used for performing this function, such as a "space" bar on a keyboard or a button on a remote control device. Because of the way input device information is read from a computer, actions in response to the suppression of a button should occur after the button is released. This condition is detected by comparing the state of the button at one point in time to the state of the button at a later point in time, until there is a change in state. The change in state indicates a release of the button. The result of this step also gives an indication of the type of icon button which was selected. If the exit button was selected, in step 164, the display is returned to the floor plan arrangement, by returning to step 120 of FIG. 4. If similar icon buttons or dedicated buttons on the input device are provided to allow a consumer to view other product categories, if such buttons are selected, the processing of consumer actions returns to step 124 of FIG. 4 to create a new three dimensional model for the newly selected product category. For example, "Left", "Right" and "Behind" icons or dedicated buttons may also be provided to allow a consumer to move to a product category to the left of, to the right of or behind the current product category so as to avoid the need to display the floor plan to select another product category.

It should be understood that, throughout this description, icons displayed on a screen for the purposes of allowing input from the consumer may be replaced by providing dedicated keys on the input device.

Figure 9:
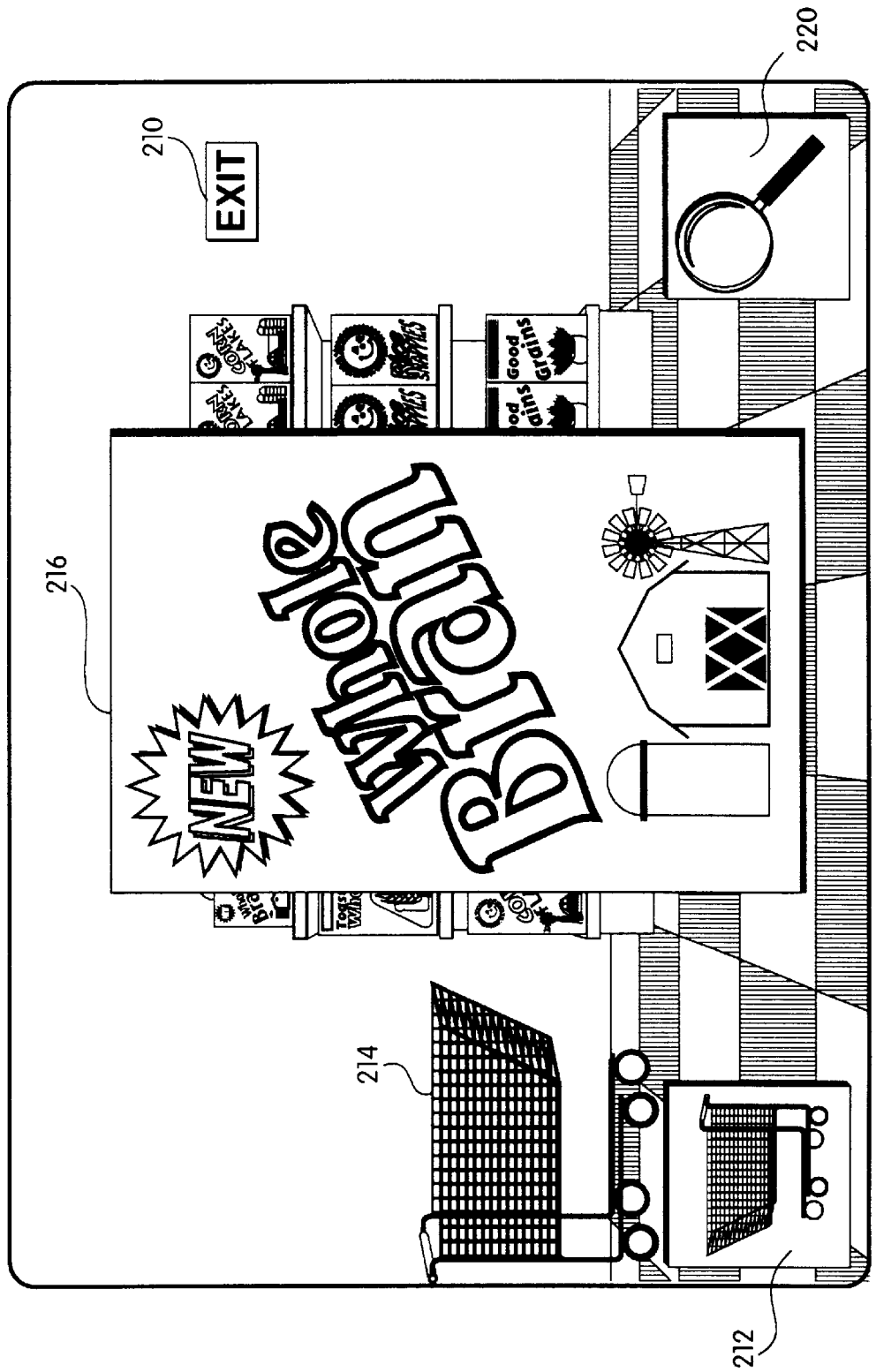
FIG. 9 is a display of a single product selected for close-up view.
Figure 10:
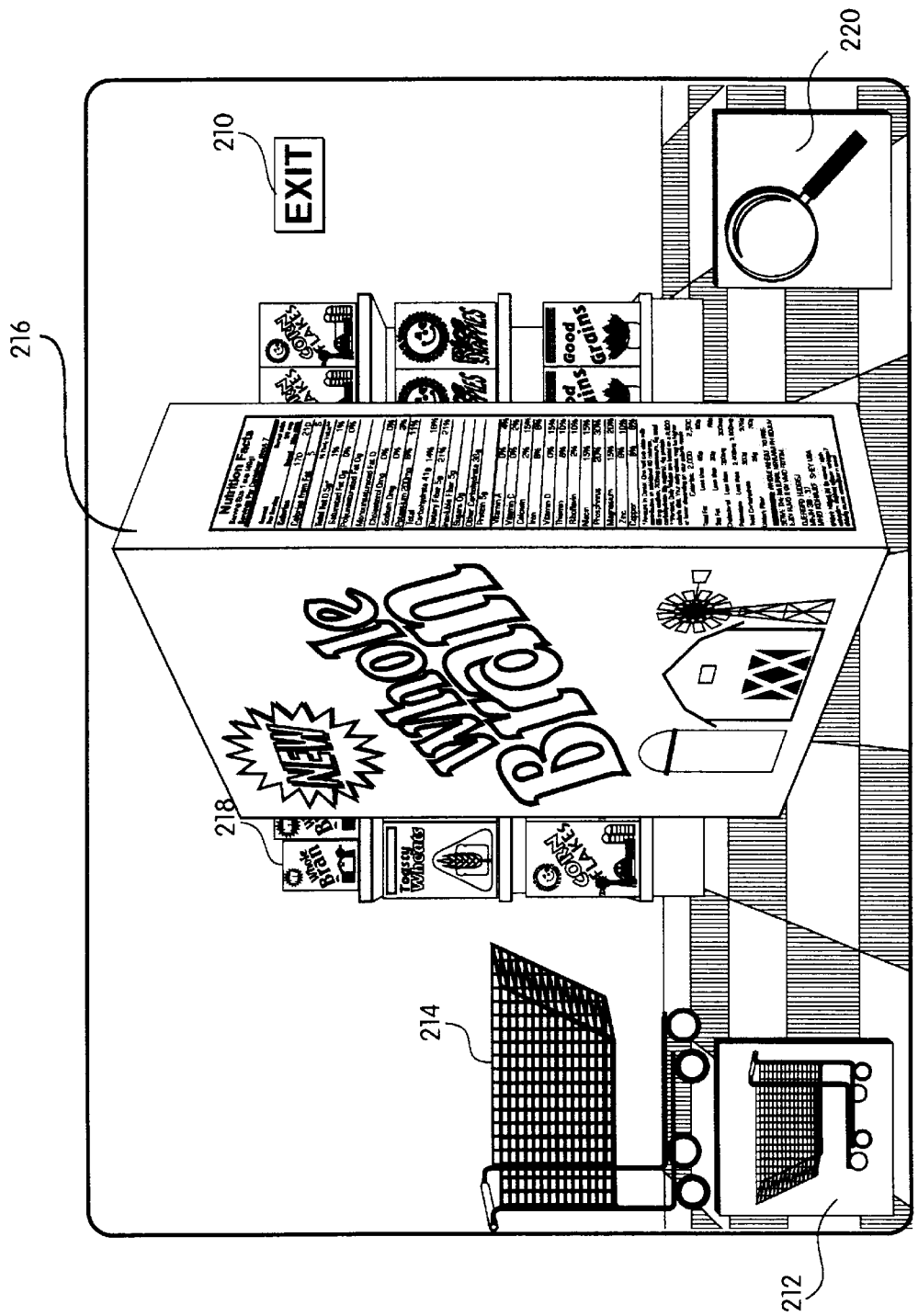
FIG. 10 is a display of a rotated selected product.
Figure 11:
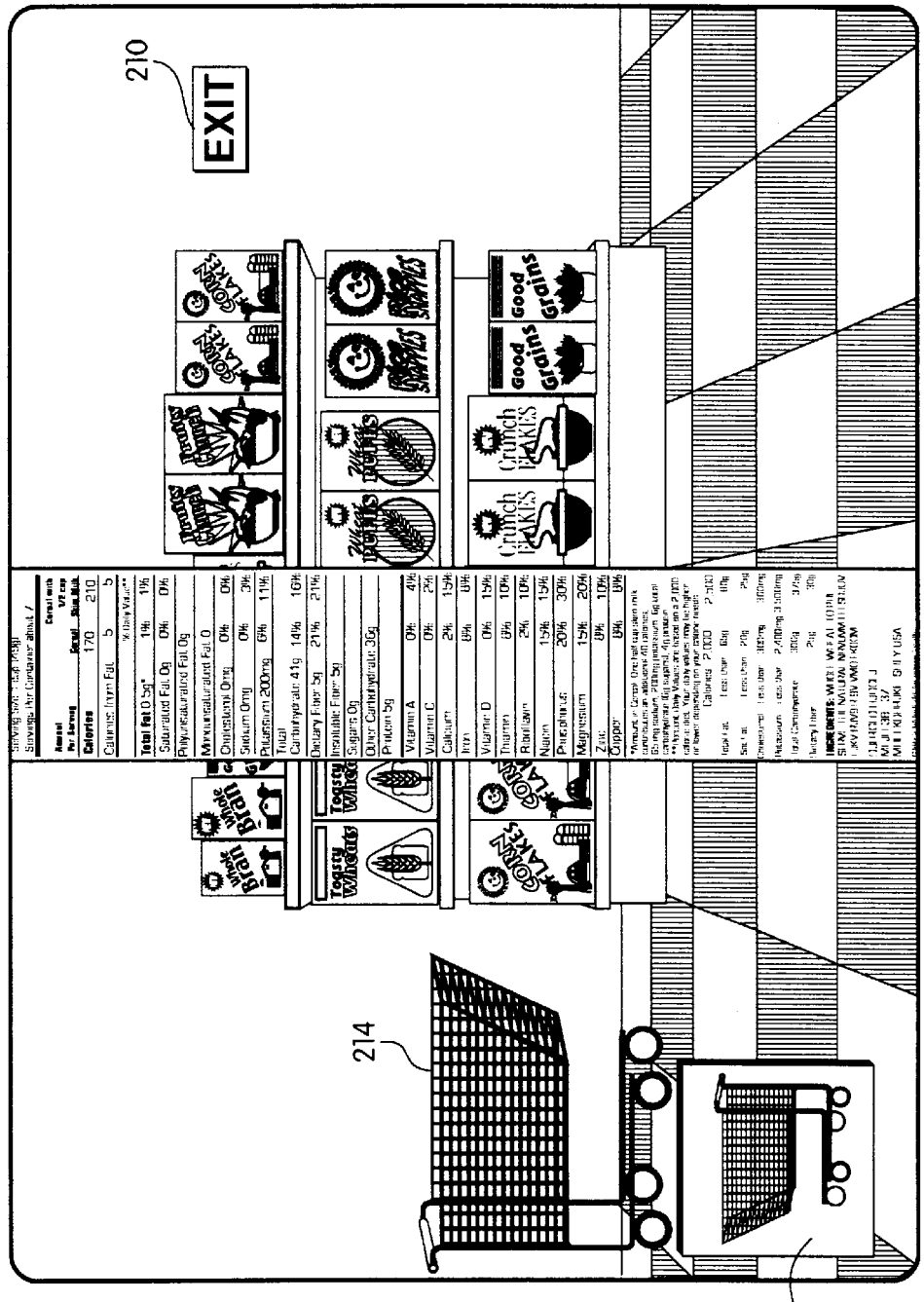
FIG. 11 is a display of an image of ingredient for a selected product.
Figure 12:
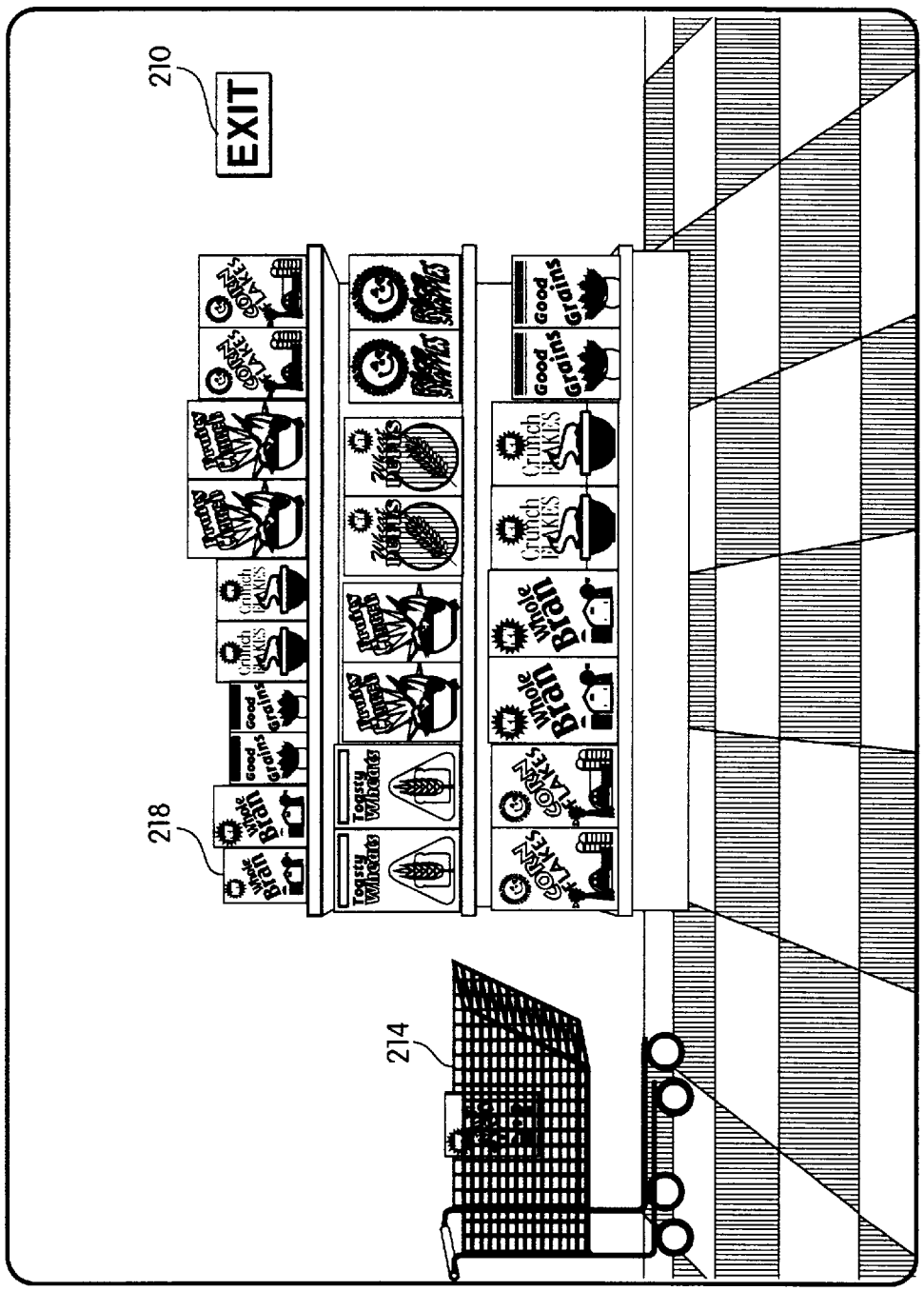
FIG. 12 is a display of a product group after a purchase has been made.

If the shopping cart icon 212 is selected, which is only possible when it is displayed, such as at 212 in FIGS. 9–11, as determined in step 166, a consumer has indicated an intention to buy a product. The product is then moved into the shopping cart 214 as shown in FIG. 12 (step 167). The shopping cart icon 212 is preferably displayed when a close-up view of a product is displayed, such as at 216 in FIGS. 9 and 10. Also note that the product image is removed from the shelf (see at 218 in FIG. 12) and that the shopping cart icon 212 and magnifying glass icon 220 are no longer displayed after a purchase. An indication of the purchased product, along with its original location on the shelf, is stored on a stack in memory of the multi-server computer. For example, the UPC code, and an indication of quantity and price may be stored on the stack. The movement of the product package into the shopping cart is performed by moving the object created to represent this product within the three-dimensional model space created by the three-dimensional modeling system. Because the front image is typically the only image seen while the product is in the shopping cart, the images of other faces are removed from the object, i.e., the texture of the back and side panels is made to be "invisible".

It is determined in step 168 whether the button pressed is the magnifying glass icon 220 (FIGS. 9 and 10), indicating that the consumer wants to view the ingredients of the product. This button is preferably only displayed and can only be pressed when a close-up view 216 of a package is shown as well, as shown in FIGS. 9 and 10. A close-up view of the ingredients for the packaged product is then displayed, as shown at 222 in FIG. 11 (step 169). The magnifying glass icon button is removed from the display and the system waits for any other event to occur from the input device. When an event occurs, the display of the ingredients is removed and the display is returned to that as shown in, for example, FIG. 9. The close-up view of the ingredients is made by moving the product object within the three-dimensional model so that a side face is presented to the consumer. The side facing the consumer is then textured with the high resolution image of the ingredients which is stored in the product database 50. All other faces are made to be invisible, to reduce processing time. When the display is returned to the state such as shown in FIG. 9, the object is moved again and the surface is retextured according to the other box faces stored for that product and product database 50.

If the consumer has touched the shopping cart 214, as determined in step 170, the most recently purchased item in the shopping cart is removed from the shopping cart and returned to the shelf. The movement of the product from the shopping cart to the shelf is performed simply by moving the object within the three-dimensional model created by the three-dimensional modeling system. The information regarding this product is popped from the stack of purchases (see step 171).

If the consumer did not touch a button, it is then determined in step 172 whether the consumer has selected a product object. If no product object is selected, the processing returns to step 160 of obtaining the next consumer input. Otherwise, it is determined whether the consumer wishes to take an item off the shelf, in step 174, or return it to the shelf in step 176.

The consumer may select an individual product for a close-up view, i.e., take it off the shelf as shown in FIG. 9, by pressing a button while the cursor on the display is located on top of that object and when a variable "zoomed" is not set. The detection of the cursor location and consumer input is performed using standard programming skills. The enlargement of the object on the screen for close-up view is performed by using one of the commands in the library of commands from the WorldToolKit. The object is moved within the three-dimensional model such that it is placed in a location which is defined to be closer to the consumer. The images of the back and side panels are then pasted to the model using the texturing operations provided by the WorldToolKit. A variable "zoomed" is then set. The magnifying glass icon 220 and shopping cart icon 212 are also displayed at this time (step 173).

While an item is off the shelf, by using left or right buttons or trackball motion, the product may be rotated about an axis as shown in FIG. 10. Rotation may be performed throughout a range of 360°. The view shown in FIG. 10 is not intended to be limiting but merely exemplary. If the consumer selects the product while it is in close-up view, it is returned to the shelf. Rotation is provided by using commands from the WorldToolKit which change the orientation of an object and which are activated in response to movement of the trackball or other inputs indicating rotation.

The consumer may place a product back on the shelf by pressing a button while the cursor on the display is located on top of that object and when a variable "zoomed" is set. The object may be displayed in either of the orientations shown at 216 in FIGS. 9 and 10 or 222 in FIG. 11. The object is then simply moved to its original location on the shelf in the three-dimensional model and the images of the back and side faces are removed from the object, i.e., those faces are textured to be invisible, to save processing time and memory. The magnifying glass icon 220 and shopping cart icon 212 are then removed from the screen and the variable "zoomed" is reset (step 175).

It is possible to provide an effect in the display when moving an object on and off the shelf or into the shopping cart to give the appearance of actual movement of the product. That is, the object can be made to have the appearance of actually being moved from one location to another by performing a series of incremental moves from the old position to the new desired position. Given a desired amount of time for this movement to occur, along with the old position and the new position, a number of moves to be performed is calculated. This number is the product of the duration of the move by the frame rate at which the three-dimensional modeling system operates. Incremental values for the X, Y and Z coordinates for the object are then computed based on the difference between the new position and the old position divided by the number of frames which are required for the move. For each frame, the old position is gradually incremented by the calculated incremental values until the object is eventually placed in its new position in the three-dimensional model.

Research data is also accumulated and stored during the processing of consumer actions. For each action taken by the consumer, a date and time stamp, an indication of the action taken, and an indication of the product affected may be stored. For example, each purchase, or each time a product is removed from the consumer shopping cart in either of steps 167 or 171 can be stored as an event which may have some marketing research significance. The number of products purchased, their frequency over time and the ordering of choices provides insight into the purchasing behavior of the consumer. From these stored actions and time stamps, one may also determine the amount of time a consumer has taken for given actions. For example, the amount of time a consumer views a product close-up, or views a particular product category, may be determined. This timing gives an indication as to how long a user takes to make a decision.

When the consumer selects the exit icon 108 on the floor plan 100, the purchase stack for each product group viewed is provided to the order processing system 68 so that the consumer's order can be prepared for delivery or pick up.

With this simulated store setting, consumers can perform a number of functions that mirror actual shopping behavior. They can view entire shelf sets or displays, select individual product packages to view in a close-up mode, view side panel ingredients, or purchase an item. They can even return items to the shelf which were previously selected for purchase. Consequently, consumers shop product categories in this simulated environment in much the same way they shop in actual stores.

This system also eliminates the need for printed catalogs and text-based shopping by displaying a three-dimensional image of products as they would appear on an actual store shelf. Whereas the use of a text-based system limits merchandising possibilities and the number of products consumers can actually view in a limited time frame, this system affords consumers the ability to pan through hundreds of products in a short period of time. Manufacturers benefit by being able to display an actual package containing their trademarks, nutrition labels, ingredients, preparation instructions and promotional information such as games or coupons.

All ordering information and other consumer actions are automatically tracked. Tracking may be performed at the household level and or at the level of individuals within the household. Tracking is beneficial to manufacturers because it can provide valuable market research information. For example, by capturing household demographics in addition to the purchase behavior, this system may measure the effectiveness of advertising campaigns and other aspects of marketing and may indicate the buying patterns of various market segments.

Having now described a few embodiments of the invention, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention as defined by the appended claims.

What is claimed is:

1. A computer-implemented process for enabling a user to virtually manipulate products in three dimensions, comprising:

accessing at least one data file, wherein the at least one data file contains information, for each of a plurality of product categories, describing dimensions of a display area in three dimensions, indications of products in the display area and locations of the products in three dimensions, wherein each product has a unique code, and wherein the at least one data file further contains information describing each product and dimensions of each product in three dimensions, accessing a product image database, wherein an image of each of the products is stored and wherein the image of each product is accessible using the unique code for the product, receiving an indication from the user of a selected product category of the plurality of product categories, retrieving the information describing the locations and dimensions of the products in three dimensions and dimensions of the display area in three dimensions for the selected product category, retrieving, using the unique code for each product in the selected product category, the image for each product in the selected product category, generating a three dimensional model of the selected product category, including a three-dimensional model of the display area and a three-dimensional model of each product in the selected product category from the retrieved information, combining the retrieved images and the generated three-dimensional models to generate a digital image representative of the selected product category, displaying the digital image to the user, receiving a command from the user through an input device, wherein the command is indicative of a manipulation of one or more of the products in the displayed digital image, modifying the three dimensional model of the selected product category and the digital image of the selected product category and redisplaying the modified digital image according to the manipulation indicated by the command from the user; and tracking each product manipulated and the manipulation performed on the product.

2. The computer-implemented process of claim 1, wherein the manipulation performed on the product is a selection of the product for purchase, and wherein the step of tracking comprises:

storing an indication of the selected product, a price for the selected product and a quantity of the selected product.

3. The computer-implemented process of claim 2, wherein the step of storing further comprises storing an indication of time spent viewing an image of the selected product category and a time spent manipulating each of the products.

4. The computer-implemented process of claim 2, further comprising:

storing in a data file indications of products selected by the user for purchase; and utilizing the data file to provide an indication to the user of products previously selected by the user for purchase.

5. The computer-implemented process of claim 1, wherein the manipulation performed on the product is a resequencing of the products in the display area according to product information and wherein the computer-implemented process further comprises:

receiving an indication of product information and a selected sort operation;

sorting the products in the selected product category according to the indication of product information and the selected sort operation;

changing the locations of the products in the display area according to results of the selected sort operation;

reconstructing the three-dimensional model of the selected product category and corresponding digital image using the changed locations of the products; and redisplaying the reconstructed digital image of the selected product category.

6. The computer-implemented process of claim 1, wherein the step of receiving the indication of the selected product category comprises:

displaying on the display a digital image of a floor plan of a store indicating the plurality of product categories on the floor plan; and allowing the user to select one of the plurality of product categories displayed on the floor plan.

7. The computer-implemented process of claim 1, wherein the step of receiving the indication of the selected product category comprises:

displaying a menu of the plurality of product categories; and allowing a consumer to select one of the plurality of product categories displayed on the menu.

8. A computer-implemented process for enabling a user to virtually manipulate products in three dimensions, the process comprising the steps of:

(A) receiving an indication from the user of a selected product category of a plurality of product categories;

(B) providing the indication to a shopping service;

(C) receiving from the shopping service a digital image representative of the selected product category, the digital image comprising a combination of retrieved images of each product in the product category and a three-dimensional model of the selected product category, the three dimensional model of the selected product category including a three-dimensional model of a display area and a three-dimensional model of each product in the selected product category;

(D) displaying the digital image to the user;

(E) receiving a command from the user through an input device, wherein the command indicates a manipulation of one or more of the products in the displayed digital image; and (F) providing the indication to the shopping service to modify the three dimensional model of the selected product category and the digital image of the selected product category, to redisplay the modified digital image according to the manipulation indicated by the command from the user, and to track each product manipulated and the manipulation performed on the product.

9. The computer-implemented process of claim 8, wherein the manipulation indicated by the command is a resequencing of the products in the display area according to product information and wherein the computer-implemented process further comprises steps of:

(G) providing an indication of the product information and a selected sort operation to the shopping service;

(H) receiving from the shopping service a reconstructed digital image of the selected product category in which the locations of the products in the display area result from sorting the products in the selected product category according to the indication of the product information and the selected sort operation and from changing the locations of the products in the display area according to results of the selected sort operation; and (I) redisplaying the reconstructed digital image of the selected product category.

10. The computer-implemented process of claim 8, wherein the step (A) comprises steps of:

(A)(1) displaying on the display a digital image of a floor plan of a store indicating the plurality of product categories on the floor plan; and (A)(2) allowing the user to select one of the plurality of product categories displayed on the floor plan.

11. The computer-implemented process of claim 8, wherein the step (A) comprises steps of:

(A)(1) displaying a menu of the plurality of product categories; and (A)(2) allowing a consumer to select one of the plurality of product categories displayed on the menu.

12. A computer system for enabling a user to virtually manipulate products in three dimensions, the computer system comprising:

means for receiving an indication from the user of a selected product category of a plurality of product categories;

means for providing the indication to a shopping service;

means for receiving from the shopping service a digital image representative of the selected product category, the digital image comprising a combination of retrieved images of each product in the product category and a three-dimensional model of the selected product category including, the three dimensional model of the selected product category including a three-dimensional model of the display area and a three-dimensional model of each product in the selected product category;

means for displaying the digital image to the user;

means for receiving a command from the user through an input device, wherein the command indicates a manipulation of one or more of the products in the displayed digital image; and means for providing the indication to the shopping service to modify the three dimensional model of the selected product category and the digital image of the selected product category, to redisplay the modified digital image according to the manipulation indicated by the command from the user, and to track each product manipulated and the manipulation performed on the product.

13. The computer system of claim 12, wherein the manipulation indicated by the command is a resequencing of the products in the display area according to product information and wherein the computer system further comprises:

means for providing an indication of the product information and a selected sort operation to the shopping service;

means for receiving from the shopping service a reconstructed digital image of the selected product category in which the locations of the products in the display area result from sorting the products in the selected product category according to the indication of the product information and the selected sort operation and from changing the locations of the products in the display area according to results of the selected sort operation; and means for redisplaying the reconstructed digital image of the selected product category.

14. The computer system of claim 12, wherein the means for receiving the indication from the user of the selected product category comprises:

means for displaying on the display a digital image of a floor plan of a store indicating the plurality of product categories on the floor plan; and means for allowing the user to select one of the plurality of product categories displayed on the floor plan.

15. The computer system of claim 12, wherein the means for receiving the indication from the user of the selected product category comprises:

means for displaying a menu of the plurality of product categories; and means for allowing a consumer to select one of the plurality of product categories displayed on the menu.

* * * * *